United States Patent
Laskaris et al.

(10) Patent No.: US 6,488,265 B2
(45) Date of Patent: Dec. 3, 2002

(54) BALL VALVE ASSEMBLY

(75) Inventors: Michael A. Laskaris, Collegeville, PA (US); Jeffrey B. Sadler, Reading, PA (US)

(73) Assignee: Hale Products, Inc., Conshohocken, PA (US)

( * ) Notice: Subject to any disclaimer, the term of this patent is extended or adjusted under 35 U.S.C. 154(b) by 0 days.

(21) Appl. No.: 09/878,016

(22) Filed: Jun. 8, 2001

(65) Prior Publication Data

US 2001/0035514 A1 Nov. 1, 2001

Related U.S. Application Data

(62) Division of application No. 09/516,418, filed on Mar. 1, 2000, now Pat. No. 6,286,811.

(51) Int. Cl.$^7$ ................................................. F16K 3/22
(52) U.S. Cl. ............................... 251/315.09; 137/246.16
(58) Field of Search ....................... 251/315.02, 315.09, 251/315.11; 137/246, 246.16

(56) References Cited

U.S. PATENT DOCUMENTS

| | | | |
|---|---|---|---|
| 2,758,547 A | | 8/1956 | Wendell et al. |
| 3,378,026 A | * | 4/1968 | Oliver ........................ 251/172 |
| 3,401,916 A | | 9/1968 | Scaramucci |

(List continued on next page.)

FOREIGN PATENT DOCUMENTS

| | | |
|---|---|---|
| DE | 29 46 298 A1 | 11/1979 |
| DE | 38 17 852 C1 | 5/1988 |
| EP | 0 040 595 A2 | 5/1981 |
| GB | 796055 | 3/1954 |
| SU | 671819 A | 7/1979 |

OTHER PUBLICATIONS

Booklet entitled: "Engineering Analysis of Threshold Compressed Air Foam Systems (CAFS)", United States Department of Agriculture, Forrest Service Technology & Development Program Project Report 8751 1201, Oct. 1987.

(List continued on next page.)

*Primary Examiner*—John Fox
(74) *Attorney, Agent, or Firm*—Akin, Gump, Strauss, Hauer & Feld, L.L.P.

(57) ABSTRACT

An improved ball valve assembly is provided for use on firefighting equipment and other applications. The ball valve assembly includes an improved seal assembly which includes both a load bearing seal element and a soft elastomeric seal element. Both seal elements are held in place by a seat member which is accommodated in a recess provided on the inside surface of the seat housing or valve body. The load bearing seal member provides support for the ball element and serves to wipe or remove debris from the ball element before the ball element engages the soft elastomer seal. As a result, the load bearing seal member removes the stress normally imparted to soft elastomer seals utilized in ball valve assemblies. Further, a lubrication fitting and passageways are provided which enable lubricant to be communicated through the housing and through the seal assembly to the ball element. The ball valve assembly may also be connected in-line between conduits using circular clamps thereby enabling the ball valve to be rotated about the central axis of the conduit for versatility in installation and positioning. The lubricant fitting may be incorporated into an overall lubrication system for lubricating other ball valves on the firefighting equipment. The ball valve assembly may also be connected to a relief valve and disposed between a firefighting pump and behind a protective panel or housing thereby disposing both the ball valve and relief valve behind a protective housing as opposed to outside of the housing or the truck body in an exposed position.

2 Claims, 8 Drawing Sheets

U.S. PATENT DOCUMENTS

| | | | |
|---|---|---|---|
| 3,462,120 A | | 8/1969 | Priese |
| 3,584,641 A | | 6/1971 | Milleville et al. |
| 3,656,498 A | * | 4/1972 | Grove et al. ............ 137/246.22 |
| 3,695,579 A | * | 10/1972 | Allen ........................ 251/174 |
| 3,752,178 A | | 8/1973 | Grove et al. |
| 3,841,601 A | * | 10/1974 | Grove et al. ........... 251/315.09 |
| 3,846,515 A | | 11/1974 | Williamson |
| 3,848,849 A | * | 11/1974 | Alexander ................ 251/314 |
| 3,856,261 A | * | 12/1974 | Jourdan .................... 251/172 |
| 3,918,681 A | | 11/1975 | Eberhardt |
| 4,163,544 A | * | 8/1979 | Fowler et al. ............. 251/328 |
| 4,254,793 A | * | 3/1981 | Scaramucci ................ 251/172 |
| 4,259,038 A | | 3/1981 | Jorgensen et al. |
| 4,280,522 A | * | 7/1981 | Pechnyo et al. ............. 137/72 |
| 4,286,614 A | * | 9/1981 | Kacal et al. .................. 137/72 |
| 4,289,296 A | * | 9/1981 | Krause ...................... 251/306 |
| 4,477,055 A | * | 10/1984 | Partridge ................... 251/174 |
| 4,587,862 A | | 5/1986 | Hoffman |
| 4,633,895 A | | 1/1987 | Eberhardt |
| 4,635,674 A | | 1/1987 | Bajka |
| 4,694,228 A | | 9/1987 | Michaelis |
| 4,751,439 A | | 6/1988 | Buchwald et al. |
| 4,795,314 A | | 1/1989 | Prybella et al. |
| 4,833,586 A | | 5/1989 | Inaba et al. |
| 4,899,825 A | | 2/1990 | Bosoni et al. |
| 4,983,891 A | | 1/1991 | Sekimoto |
| 5,096,389 A | | 3/1992 | Grady |
| 5,163,655 A | * | 11/1992 | Chickering, III et al. ... 251/174 |
| 5,174,383 A | | 12/1992 | Haugen et al. |
| 5,218,988 A | | 6/1993 | McNamara et al. |
| 5,232,052 A | | 8/1993 | Arvidson et al. |
| 5,419,532 A | | 5/1995 | Fan |
| 5,494,112 A | | 2/1996 | Arvidson et al. |
| 4,023,773 A | | 5/1997 | Wise |
| 6,047,952 A | | 4/2000 | Laskaris et al. |

OTHER PUBLICATIONS

Article entitled: "Foam as a Fire Suppressant: An Evaluation", Schlobohm et al., *Gen. Tech.*.

Pamphlet entitled: "Darley Champion—SHE Three Stahe Centrifugal Midship Mounted Fire Pumps" by W.S. Darley & Co.

Pamphlet entitled: "2HPC Pump Air Clutch Assembly" by Hale Fire Pump Co.

Pamphlet entitled: "Hale Type QL, QL2, QL3, QL4 Pump" by Hale Fire Pump Co.

Pamphlet entitled: "Hale Type Zm Pump" by Hale Fire Pump Co., Inc.

* cited by examiner

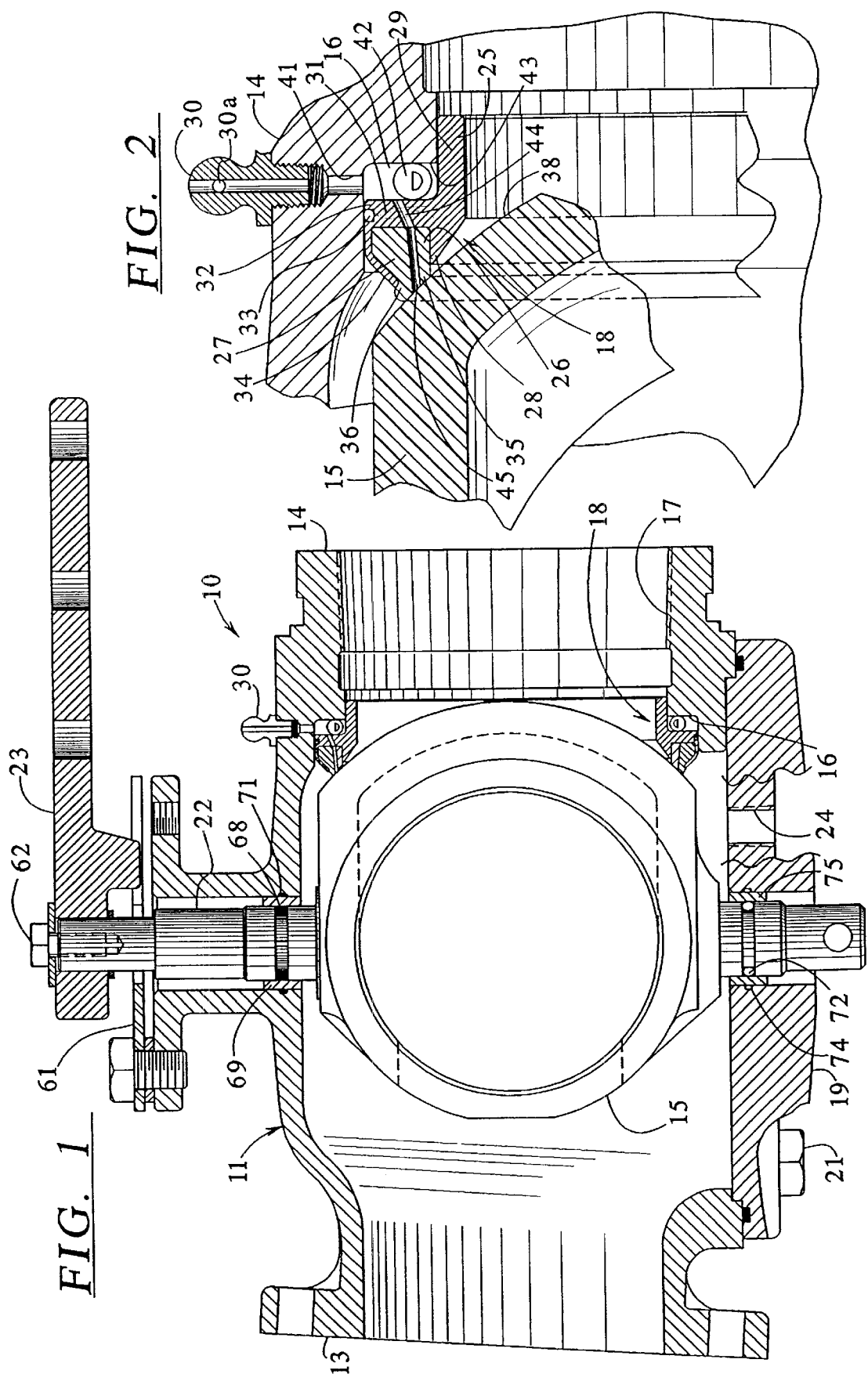

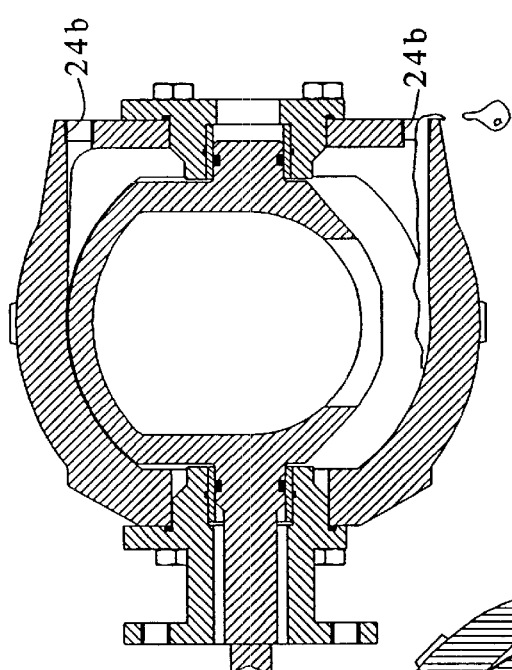
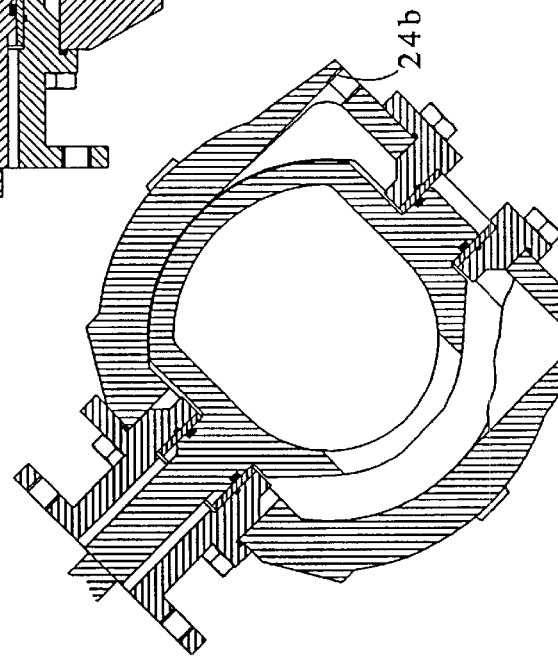
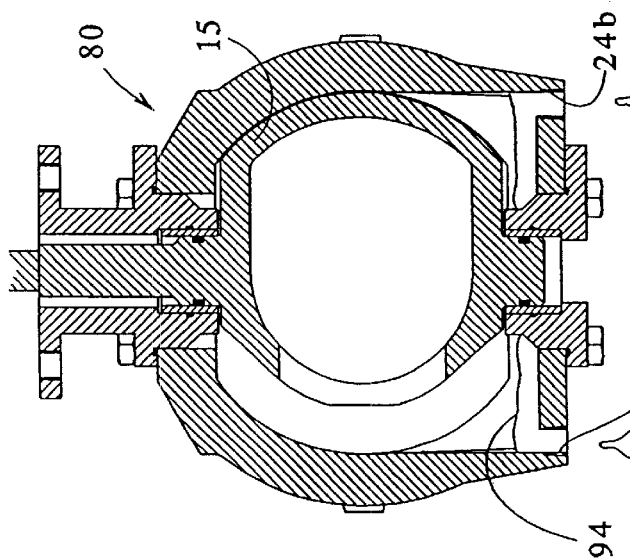

BALL VALVE ASSEMBLY

This is a division of application Ser. No. 09/516,418, filed Mar. 1, 2000, now U.S. Pat. No. 6,286,811.

FIELD OF THE INVENTION

The present invention relates generally to ball valves and more specifically, to ball valves used as intake, in-line or discharge valves for fire pumps and firefighting apparatuses.

BACKGROUND OF THE INVENTION

In firefighting apparatuses, ball valves are used at both the intake and discharge outlets for firefighting pumps as well as in in-line positions in the piping of a firefighting unit. Over periods of time, the seals of the ball valves tend to adhere to the ball component of the valve unit. Further, mineral deposits such as dirt or grit may deposit on the ball component. Depending upon the environment and the specific media flowing through the valve, the valves may become extremely difficult to open. Further, because the ball valves are often disposed in areas with little space, the ball valves must be provided with relatively short handles that transmit little torque to the valve. As a result, only firefighters with superior physical strength are able to open and close ball valves that have accumulated dirt and grit on the ball component.

The only way to overcome the above problem is to lubricate the valve seat or seal as well as the ball component. Unfortunately, due to space constraints on firefighting apparatuses, the ball valves may be disposed in inconvenient places or buried underneath other operating elements of the firefighting apparatus. As a result, the ball valves may be difficult to obtain access to which makes them very difficult to lubricate. Typically, the firefighting apparatus must be pulled out of service and the lubrication performed by qualified mechanics.

Another way to overcome the above sticking problem has been to utilize a plastic ball component and plastic seat elements. The plastic elements are typically fabricated from ultra-high molecular weight polyethylene which is considered self-lubricating. Unfortunately, this solution presents its own shortcomings because polyethylene is susceptible to deterioration from rust, grit and other mineral deposits that form on the ball component. Specifically, when the valve is opened and closed, the deposits on the ball component score and cut into the valve seat and/or the ball component itself thereby resulting in leakage and/or valve failure.

Another approach utilizes a soft elastomer for the seal element as opposed to the rigid polymer or high molecular weight polyethylene discussed above. Soft elastomer material is available that is resistant to tears and cuts. Further, soft elastomers can be impregnated with lubricants which further enhance their performance and operating life. However, it has been found that the use of soft elastomers still results in the sticking problem discussed above and has not reduced the amount of torque required to open or close a ball valve that has been in service for an extended period of time.

Further, another problem associated with the use of soft elastomers as seal elements is that soft elastomers often fail to provide support for the ball component of larger valves, such as valves with ball components having diameters greater than two inches. It has been found that, with the use of larger ball components, an increased amount of seal pre-load must be applied between the ball and the seal element in order to provide the support necessary for the ball component. As a result, the increased amount of seal pre-load that is required also increases the amount of torque necessary to open and close the valve. Further, the stress resulting from the increased seal pre-load can also lead to premature failure of the soft elastomer seal.

As a result, both the rigid polymer valve seats and seals and the soft elastomer seals each have their associated shortcomings. Both types of seals are susceptible to premature damage and failure. Further, once any seal of a ball valve is damaged, the valve must be repaired and, as discussed above, this often requires removing the firefighting apparatus from service. It has also been suggested to employ seal elements on both sides of the ball component; however, this further exacerbates the problem of the torque required to open and close the valve once the valve has been in use for a sufficient time to accumulate dirt, grit and other mineral deposits on the ball component.

Another problem associated with the ball valves used in firefighting apparatuses is the inflexibility of the mounting of the ball valve. Specifically, due to cramped space requirements on firefighting apparatus, it is often difficult to mount the actuator of the valve in a position where it can be utilized by firefighting personnel. One solution to this problem has been to make the actuator positioning adjustable in 90° increments or in 45° increments by using various adaptors between the valve body and the actuator. Further, the servicing of valves often proves difficult because the bolts required to mount the actuator on the valve are often difficult to obtain access to in the cramped environment of today's modern firefighting apparatuses. Still further, the typical installment of such valves requires four bolts disposed on each side of the valve that are used to mount the valve between the pump and a conduit or in-line between two pieces of conduit. The use of these bolts disposed on either side of the valve add to the overall effective length of the valve which is disadvantageous due to the limited space availability on firefighting apparatuses.

Still another problem associated with current ball valves of firefighting apparatuses is specifically associated with large diameter hoses which are desirable because they provide increased water flow to the fire. As noted above, larger hose diameters require larger ball valves which, in turn, as discussed above, are prone to premature failure and leakage. Further, when larger diameter hoses are employed, they present their own hazards because they typically have lower pressure ratings than smaller hoses. This problem is exacerbated if the flow of water or firefighting material is shut off at a downstream location. The resulting increase in pressure in the hose can cause the hose to snap and fling violently.

As a result, one solution to this problem has been to locate a remote adapter containing a relief valve on the pump discharge outside of the pump housing or the panel that surrounds the pump. However, this solution creates its own problem in that the relief valve must also be located outside of the housing or panel as well. Another solution is to provide a portable unit outside the pump panel (containing a relief valve) for that line.

However, the location of the relief valve outside of the panel is dangerous because the release of exhaust water from the relief valve poses a safety hazard to firefighting personnel. Further, in the event the relief valve fails, there is no protective panel or housing between the failed relief valve and the firefighting personnel. Still further, the relief valve is exposed, thereby making it accessible to being tampered with, particularly the relief valve pressure setting. For example, an inexperienced person may reset the pressure to a level above the safety limits of the hose and/or firefighting industry standards. Still further, placement of the discharge outlet and relief valve outside of the housing panel results in the discharge outlet and relief valve extending outward beyond the body of the firetruck, which poses a significant driving hazard.

Accordingly, there is a need for an improved seat and sealing element for ball valves which will result in a reduction in the amount of torque required to operate the valves, which reduce the likelihood of premature leakage and which reduce the likelihood of premature failure of the ball valve. Further, there is a need for an improved ball valve design which provides greater flexibility in mounting the ball valve so that the actuator and the ball valve itself can be more readily accessed after installation for both operation and maintenance. Still further, there is a need for an improved system and method for lubricating ball valves of firefighting apparatuses to thereby make them more easy to use and increase their operating life span. And, there is a need for an improved ball valve and relief valve design which will enable the relief valve to be disposed within the housing or panel of the truck with the ball valve as opposed to outside of the housing or panel of the truck.

SUMMARY OF THE INVENTION

The present invention satisfies the aforenoted needs by providing an improved ball valve which comprises a valve body having two open ends in a ball disposed within the valve body. One end of the valve body comprises a seat housing. The seat housing comprises an inner surface with a recess for accommodating a seal assembly between the seat housing and the ball. The seal assembly comprises a seat member, a load bearing seal and a soft seal. The seat member comprises a cylindrical body extending along the inner surface of the seat housing. The cylindrical body comprises an inner end directed at the ball and an outer end directed away from the ball. The cylindrical body is connected to a radially outwardly extending flange which is disposed between the inner and outer ends thereof and that extends into the recess of the seat housing. The flange supports the load bearing seal and the soft seal between the flange and the ball.

In an embodiment, the load bearing seal is disposed between the soft seal and the inner end of the cylindrical body of the seat member.

In an embodiment, the soft seal comprises a nitrile rubber impregnated with polytetrafluoroethylene as a lubricant.

In an embodiment, the load bearing seal comprises polytetrafluoroethylene with a carbon graphite filler for added strength.

In an embodiment, the load bearing seal comprises an outer end that rests against the flange of the seat member and an inner end that engages the ball. Similarly, the soft seal comprises an outer end that rests against the flange and an inner end that engages the ball. The inner end of the soft seal extends laterally beyond the inner end of the load bearing seal.

In an embodiment, the inner end of the soft seal further comprises a bulbous tip.

In an embodiment, the recess of the seat housing forms an annular ledge that faces the ball. The flange of the seat member is spaced from the ledge with a sealing ring disposed therebetween.

In an embodiment, the flange of the seat member comprises an outer end connected to an outer wall that extends towards the ball. The outer wall is spaced from the inner end of the cylindrical body with the soft seal and load bearing seal trapped therebetween.

In an embodiment, the outer wall curves inwardly towards the soft seal thereby trapping the soft seal and the load bearing seal between the inner end of the cylindrical body and the outer wall.

In an embodiment, the seat housing comprises an outer surface and a passageway that provides communication between the recess and the outer surface. The valve further comprises a check-type lubrication fitting connected to the passageway at the outer surface of the seat housing. The flange of the seat member comprises an aperture that extends through the flange and provides communication between the passageway and the soft seal and the load bearing seal.

In an embodiment, the seal assembly further comprises an aperture that extends through the flange of the seat member and between the soft seal and load bearing seal. The aperture thereby provides communication between the recess and the ball.

In an embodiment, the recess of the seat housing forms an annular ledge that faces the ball. The flange of the seat member is spaced from the ledge with a sealing ring disposed therebetween. The sealing ring is disposed radially inwardly from the inner surface of the seat housing thereby providing an annular space defined by the sealing ring, the inner surface of the seat housing, the ledge and the seal located on the flange side of the seat member. The seat housing further comprises a passageway extending through the housing and providing communication between the annular space and a lubrication fitting. The seal assembly further comprises an aperture that extends through the flange and between the soft seal and the load bearing seal thereby providing communication between the annular space and the ball.

In an embodiment, the ball valve further comprises an inlet conduit and an outlet conduit that share a common axis. The inlet end of the valve body is connected to the inlet conduit with a first circular clamp and the outlet end of the valve body is connected to the outlet conduit with a second circular clamp. As a result, the ball valve may be rotated about the common axis of the inlet and outlet conduits thereby providing enhanced flexibility with respect to the position of the ball valve actuator.

In an embodiment, the valve body is connected to a bottom cover plate which includes two drain ports disposed on opposing sides of the common axis.

In an embodiment, the valve body includes drain ports disposed on opposing sides of the common axis.

In such an embodiment, the cover plate may be removably mounted to the valve body with fasteners, such as bolts or screws.

In an embodiment, the inlet and outlet ends of the valve body may further comprise circumferential flanges. Similarly, the inlet and outlet conduits may further comprise circumferential flanges. The first and second clamps being clamped around the circumferential flanges of the inlet conduit and inlet end of the valve body and the outlet conduit and outlet end of the valve body respectively.

In an embodiment, the present invention provides an improved lubrication system for the ball, valves of a firefighting apparatus or vehicle. The lubrication system of the present invention includes a pump for pumping metered amounts of lubricant. The pump is connected to at least one manifold which, in turn, is connected to at least one lubrication fitting. The lubrication fittings are connected to an outer surface of a seat housing of a ball valve as described above. Metered amounts of lubricant may thereafter be pumped through the lubrication fitting and to the soft and load bearing seals as well as to the ball component. In such an embodiment, a suitable lubricant metering system can be employed such as the Grease Jockey® system provided by Lubriquip, Inc.

In an embodiment, the lubrication pump is controlled by a controller.

In an embodiment, the lubrication pump is powered by air pressure.

In an embodiment, the lubrication pump is connected to lubrication fittings disposed on the pump itself and/or to lubrication fillings disposed on other components of the firefighting apparatus for purposes of preventative maintenance.

In an embodiment, the present invention provides an improved seal assembly for a ball valve which includes the seat member, load bearing seal and soft seal elements as described above.

In an embodiment, the present invention provides an improved configuration for a firefighting apparatus which includes a pump having a discharge outlet that is connected to the inlet end of a ball valve body. The valve body comprises an outlet end connected to an outlet conduit which passes through a housing panel. Thus, the valve body is disposed between the housing panel and the pump. The outlet conduit is also connected to a relief valve which also is disposed between the pump and the panel. Therefore, the ball valve and relief valve are disposed inside the housing panel, between said panel and said pump.

The present invention also provides an improved method of lubricating ball valves of firefighting apparatuses which comprises the step of pumping lubricant to a lubrication fitting connected to the outer surface of a seat housing of the improved ball valve assembly of the present invention as discussed above. Such an improved method can be carried out automatically using an automated system such as the Grease Jockey® system sold by Lubriquip, Inc.

It is therefore an advantage of the present invention to provide an improved seal assembly for ball valves.

Another advantage of the present invention is to provide an improved ball valve assembly.

Another advantage of the present invention is to provide improved ball valves for firefighting equipment.

Another advantage of the present invention is to provide an improved seal assembly for ball valves which combines benefits of load bearing seal elements and soft seal elements in a single seal assembly.

Another advantage of the present invention is that it provides an improved means for lubricating ball valves.

Yet another advantage of the present invention is that it provides ball valves for firefighting equipment that require less torque to open or close than that of prior art ball valves for firefighting equipment. Specifically, the load bearing seal reduces the operational torque of the valve by supporting the ball without adding additional pre-load to the seal. Further, the load bearing seal reduces the operational torque of the valve by acting as a wiper as well as a bearing for the ball. As a result, the load bearing seal decreases the drag or friction between the soft seal and the ball. Further, as the load bearing seal removes grit from the ball by acting as a wiper, also lubricates the ball surface. Thus, in addition to reducing the operational torque of the valve, the load bearing seal also extends the life of the soft seal by reducing the stresses on the soft seal. Still further, the load bearing seal acts as a secondary seal or a backup to the soft seal.

Another advantage of the present invention is that it provides an improved system for lubricating ball valves of firefighting equipment. By lubricating the ball valve, dirt and grime can be removed or washed off of the ball which extends the useful life of the seal members.

Yet another advantage of the present invention is that it provides an improved method for lubricating ball valves of firefighting equipment.

Still another advantage of the present invention is that it provides an improved ball valve whose position upon installation may be infinitely (or infinitely adjustable) rotated so as to make the actuator and serviceable elements of the ball valve more accessible.

And another advantage of the present invention is that it provides an improved firefighting apparatus configuration whereby the ball valve and relief valve are disposed behind the housing panel and between the panel and the pump.

Other objects and advantages of the present invention will be apparent from the following detailed description and appended claims, and upon reference to the accompanying drawings.

BRIEF DESCRIPTION OF THE DRAWINGS

For a more complete understanding of the present invention, reference should now be made to the accompanying drawings, wherein:

FIG. 1 is a sectional view of the ball valve assembly of the present invention;

FIG. 2 is a partial sectional view of the ball valve assembly shown in FIG. 1;

FIGS. 5–7 are sectional views of a ball valve assembly made in accordance with the present invention, particularly illustrating the ability of the ball valve to be infinitely rotated so that water may be drained from the drain ports;

Figure 3:
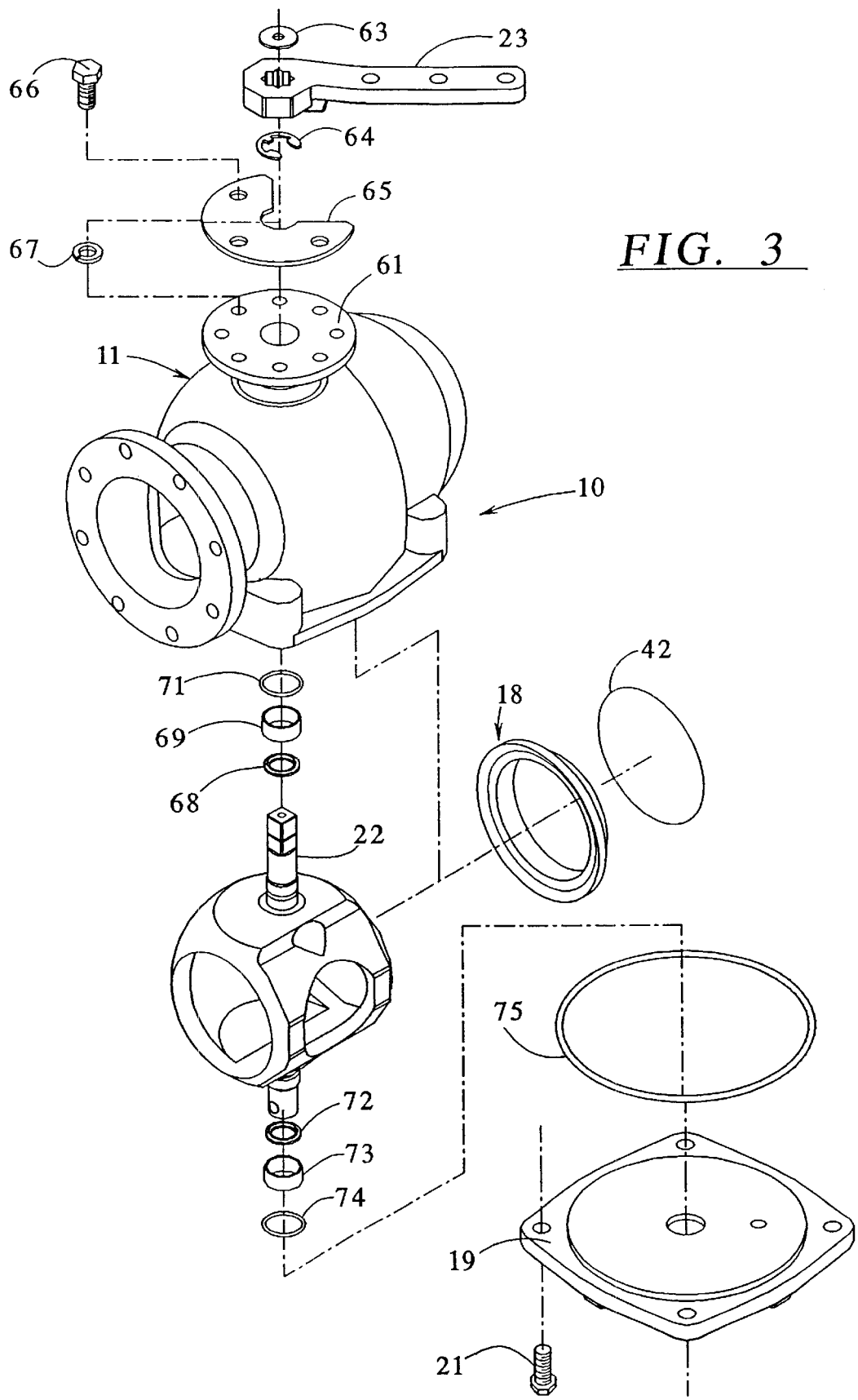
FIG. 3 is an exploded view of a ball valve made in accordance with the present invention.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Turning first to FIG. 1, a ball valve 10 made in accordance with the present invention is illustrated in a sectional view. The valve 10 includes a valve body 11 with two opposing ends 13, 14 and a ball 15 disposed between the two open ends 13, 14. The open end 14 also serves as a seat housing in that a recess 16 is formed in the inner surface 17. The recess 16 accommodates a seal assembly shown generally at 18 and described in greater detail with respect to FIG. 2. Still referring to FIG. 1, the valve body 11 is also detachably connected to a bottom cover 19 by way of the threaded fastener shown at 21. The ball 15 is connected to a trunnion or shaft 22 having an upper end that is connected to a handle 23 and a lower end that extends through the bottom cover plate 19. The bottom cover plate 19 also includes a drain port 24. The seal assembly 18 is lubricated by way of the fitting 30 which, again, will be described in greater detail with respect to FIG. 2. Additional details regarding the assembly of the valve 10 will be further discussed with respect to FIG. 3.

Turning to FIG. 2, the seal assembly 18 comprises three principle components: the seat member 25; the load bearing seal 26; and the soft seal 27.

The seat member 25 includes a cylindrical body having an inner end 28 directed toward the ball 15 and an outer end 29 directed away from the ball 15 as shown in FIG. 2. The cylindrical section of the seat member 25 is connected to an outwardly radially extending flange 31 which is disposed between the inner end 28 and outer end 29 of the cylindrical body 25. The flange 31 extends radially outwardly into the recess 16 disposed in the seat housing 14. An outer or distal end 32 of the flange 31 includes a recess for accommodating a seal 33 and also is connected to an outer wall shown at 34. As shown in FIG. 2, the outer wall 34 extends toward the ball 15 in a generally parallel relationship with respect to the inner end 28 of the cylindrical section 25 but then curves inwardly towards the soft seal 27. Thus, the inner end 28 of the cylindrical body 25 and the outer wall 34 provide a partially enclosed annular space for trapping the load bearing seal 26 and soft seal 27 in place.

Figure 4:
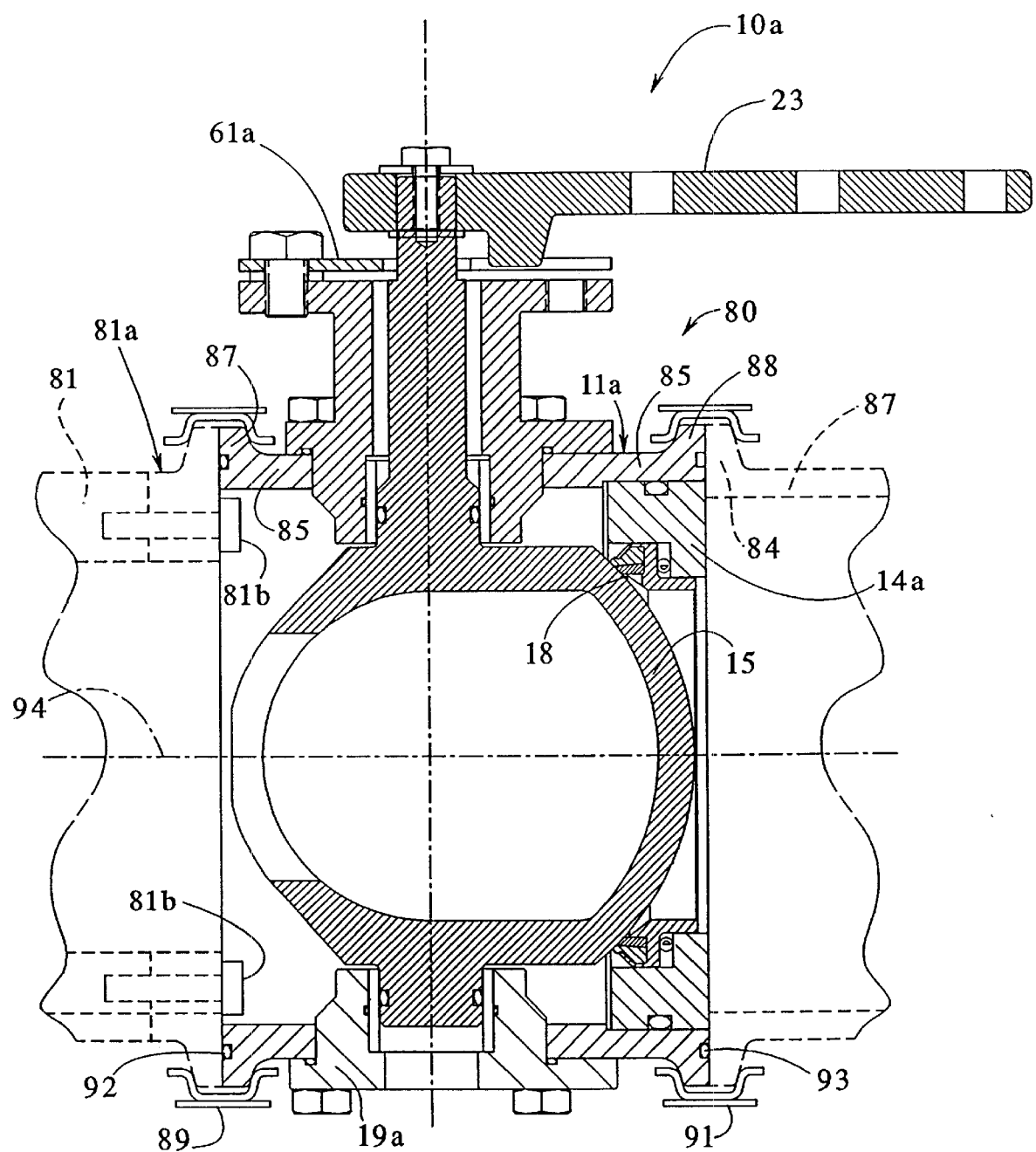
FIG. 4 is a sectional view of another ball valve assembly made in accordance with the present invention.

It will be noted that the seat housing 14 may be integral with the valve body 11 (see FIG. 1) or the seat housing 14a may be a separate component from the valve body 11a (see FIG. 4).

It will also be noticed from FIG. 2 that the load bearing seal 26 includes an inner end 35 and the soft seal 27 also includes an inner end 36. The inner end 35 of the load bearing seal 26 engages the ball 15 and acts as a support for the ball 15 as well as a bearing and a wiper. Specifically, in a preferred embodiment, the load bearing seal 26 is fabricated from carbon-graphite PTFE. This material is used because of the ability of PTFE to fill gaps of opposing material and to act as a smoothing agent, filling in porous areas and imperfections in the surface 38 of the ball 15. Thus, the load bearing seal 26 provides a thin film of lubrication on the surface 38 of the ball element 15. Further, by providing adequate support for the ball 15, the employment of the load bearing seal 26 enables the soft seal 27 to act only as a sealing element, thereby removing unnecessary pre-loading on the soft seal which, as discussed above, is problematic in prior art designs utilizing soft elastomer seal elements. Therefore, overall stresses imposed on the soft seal 27 are reduced thereby increasing the seal life and reducing the forces needed to open and close the valve 10. Further, the employment of the load bearing seal 26 provides more support for the soft seal 27 than the seat member 25 acting alone because of the engagement between the load bearing seal 26 and the ball 15. This added support provided by the load bearing seal 26 enables the soft seal 27 to form a more consistent and uniform shape in the seat fabrication process, thereby reducing the appearance of undulations and imperfections in the soft seal 27 and enhancing the performance of the soft seal 27. Further, the load bearing seal 26 functions as a wiper and acts to clean the ball 15 of foreign matter and debris before said debris reaches the soft seal 27. This action also increases the useful life of the soft seal 27 by reducing its exposure to dirt, grit and foreign matter.

To further enhance the performance of the seal assembly 18, the lubrication fitting 30 with a check valve 30a is provided and is connected to a passageway 41 that extends through the seat housing 14. The passageway 41 provides communication between the lubrication fitting 25 and the recess 16. Also, a seal ring 42 is disposed in the recess 16 between the flange 31 and the ledge 43 that defines the outer end of the recess 16 and which faces the ball 15. In addition to providing a seal, the sealing ring 42 also spaces the flange 31 outward from the ledge 43 and enables the annular space or the portion of the recess 16 defined by the sealing ring 42, the ledge 43 and the flange 31 and the seal 33 to serve as a reservoir for lubricant. An aperture 44 or passageway extends through the flange 31 to provide communication between the annular space or recess 16 and the seals 26, 27. In the preferred embodiment illustrated in FIG. 2, the aperture or passageway 44 continues between the seals 26 and 27 as shown in FIG. 2. This additional passageway, shown at 45, may be provided by a series of knurls, grooves or slots located between the load bearing seal 26 and the soft seal 27. Further, a spacing element could be provided. The important feature is to ensure that communication is provided through the seals 26, 27 to the ball 15 or, more specifically, to the surface 38 of the ball 15.

Figure 21:
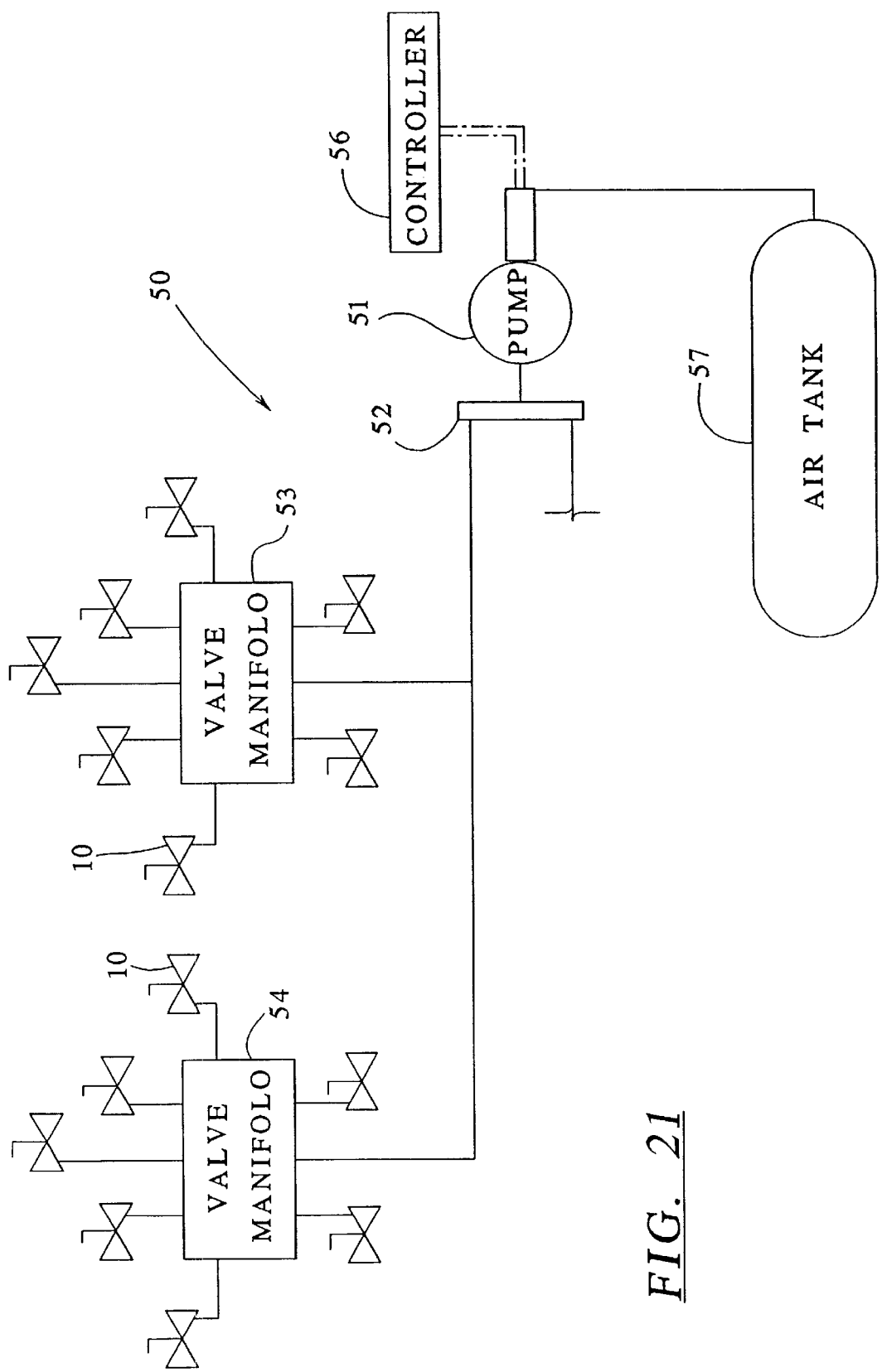
FIG. 21 is a schematic illustration of a lubricating system for a firefighting apparatus made in accordance with the present invention.

Lubrication may be provided to the fitting 30 by way of a lubrication system 50 as shown in FIG. 21. Specifically, a pump 51 is provided to pump lubricant through a primary manifold 52 to one or more secondary manifolds shown at 53, 54. The secondary manifolds 53, 54 are, in turn, in communication with one or more valves shown at 10. The operation of the pump 51 may be automatically controlled by a controller 56. Further, the pump may be powered by air pressure, such as a firetruck's air tank 57.

Still further, an automated lubrication system which provides metered amounts of lubricant to each fitting 30 may be provided by way of the Grease Jockey® system sold by Lubriquip, Inc. The advantage of providing a metered amount of lubricant to each fitting 30 would be provided with an equal and requisite amount of lubricant as opposed to the lubricant proceeding through a path of least resistance.

Thus, the combination of the lubrication system 50 with the improved seal assembly 18 provides two substantial contributions to the art of ball valves on firefighting equipment. First, the frequency and amount of servicing for ball valves has been reduced dramatically with the ability to lubricate the seal assemblies 18. In addition, the design and structure of the seal assemblies 18 provide improvements to the use of load bearing seals only or, in the alternative, the employment of soft elastomer seals only due to the enhanced combination of the load bearing seal 26 and soft seal 27 of the seal assembly 18. The seal assembly 18 as shown in FIGS. 1 and 2 will last longer, require less service and will perform better than ball valve seals constructed with only a load bearing seal member or only a soft seal member supported by a seat member.

Turning to FIG. 3, the components of the ball valve 10 are described in greater detail. The handle 23 is connected to the stem 22 of the ball 15 by the bolt 62 (see FIG. 1). The washer 63 is disposed between the bolt 62 and the handle 23. A retaining ring 64 is disposed between the handle 23 and the stop plate 65. The stop plate 65 is connected to the top collar 61 by way of the bolt 66 and washer 67.

Referring to FIGS. 1 and 3 together, the trunnion 22 passes through an inner seal 68, a bearing 69 and an outer seal 71, the positions of which are shown in FIG. 1. Similarly, the lower end of the trunnion or shaft 22 passes through an inner seal 72, bearing 73 and outer seal 74, the positions of which are also shown in FIG. 1. The bottom cover 19 is connected to the valve body 11 by way of a plurality of bolts, one of which is shown at 21. An O-ring seal 75 perfects the seal between the cover 19 and the valve body 11.

Turning to FIG. 4, an additional embodiment in the form of a valve 80 is illustrated. The construction of the seal assembly 18 is essentially the same as that described in FIGS. 1 and 2 and will not be discussed again in detail here. The valve 80 is shown not equipped with a lubrication system in the form of the fitting 25 and passages 41 and 45 as shown in FIG. 2. However, such lubrication system could be incorporated into the valve 80 shown in FIG. 4. The main difference between the valve 80 shown in FIG. 4 and the valve 10 shown in FIGS. 1 and 2 is the way in which the valve 80 is connected to the conduit 81, 82.

Specifically, each conduit 81, 82 includes a radial flange 83, 84. (It will be noted that the conduit 81 is shown attached to an adapter 81a which will be described below. The conduit 81 can also be integrally connected to the flange 83.) Similarly, the ends 85, 86 of the valve 80 include matching radial flanges 87, 88 respectively. These flanges 87, 88 abuttingly engage the flanges 83, 84 of the conduits 81, 82. Circular clamps 89, 91 clamp the flanges 83, 87 and 84, 88 together in the arrangement shown in FIG. 4. The outer faces of the flanges 87, 88 include slots for accommodating seals 92, 93. As a result of the employment of the circular clamps 89, 91, the valve 80 may be rotated with respect to the center line 94 or common axis of the conduits 81, 82.

The ability of the valve 80 to be rotated is very important when the tight and cramped space available for such valve 80 in firefighting equipment is considered. Specifically, it may be crucial to be able to rotate the valve 80 in order to provide adequate room to rotate the handle 23 or to position the attached valve actuator 95 (FIGS. 17–20 and 22). Thus, in addition to the ability to attach the handle 23 to the stem 22 in a variety of positions as shown in FIGS. 9–16, the valve 80 itself can be rotated to an infinite number of angular positions with respect to the common axis 94. It will also be noted that the valve body 11a and top collar 61a are separate components in the design of the valve 80 and the seat housing 14a is also a separate component from the valve body 11a or the end 86 in contrast to the design of the valve 10 as shown in FIG. 1. It will be noted that the configuration of the bottom cover 19a of the valve 80 as shown in FIG. 4 also differs from the bottom cover 19 of the valve 10 shown in FIG. 1. Further, while not shown in FIG. 4, it will be noted that the valve body 11a includes two drain ports 24a, 24b as shown in FIGS. 5–7.

Further, still referring to FIG. 4, the valve 10a can be connected to the conduit 81 (or the pump) by incorporating the adapter shown at 81a. The adapter 81a can be mounted to the conduit 81 (or pump) by a plurality of bolts shown at 81b. The bolts 81b are disposed within the waterway. This design is strategically important because it enables the valve 10a to have a shorter effective length than otherwise would be available if the mounting bolts were disposed outside of the valve. As discussed above, the short effective length of the valve 10a is important due to the tight space constraints of most firefighting apparatuses.

Turning to FIGS. 5–7, the importance of the ability of the valve 80 to be rotated also provides another advantage in that water shown at 94 can be drained from the valve 80 by rotating the valve to completely drain water from either side of the ball 15 through the drain ports 24a, 24b. Thus, in addition to making the handle 23 more accessible, rotation of the valve 80 in either direction serves the purpose of draining water or other fluid from the valve 80.

Figure 8:
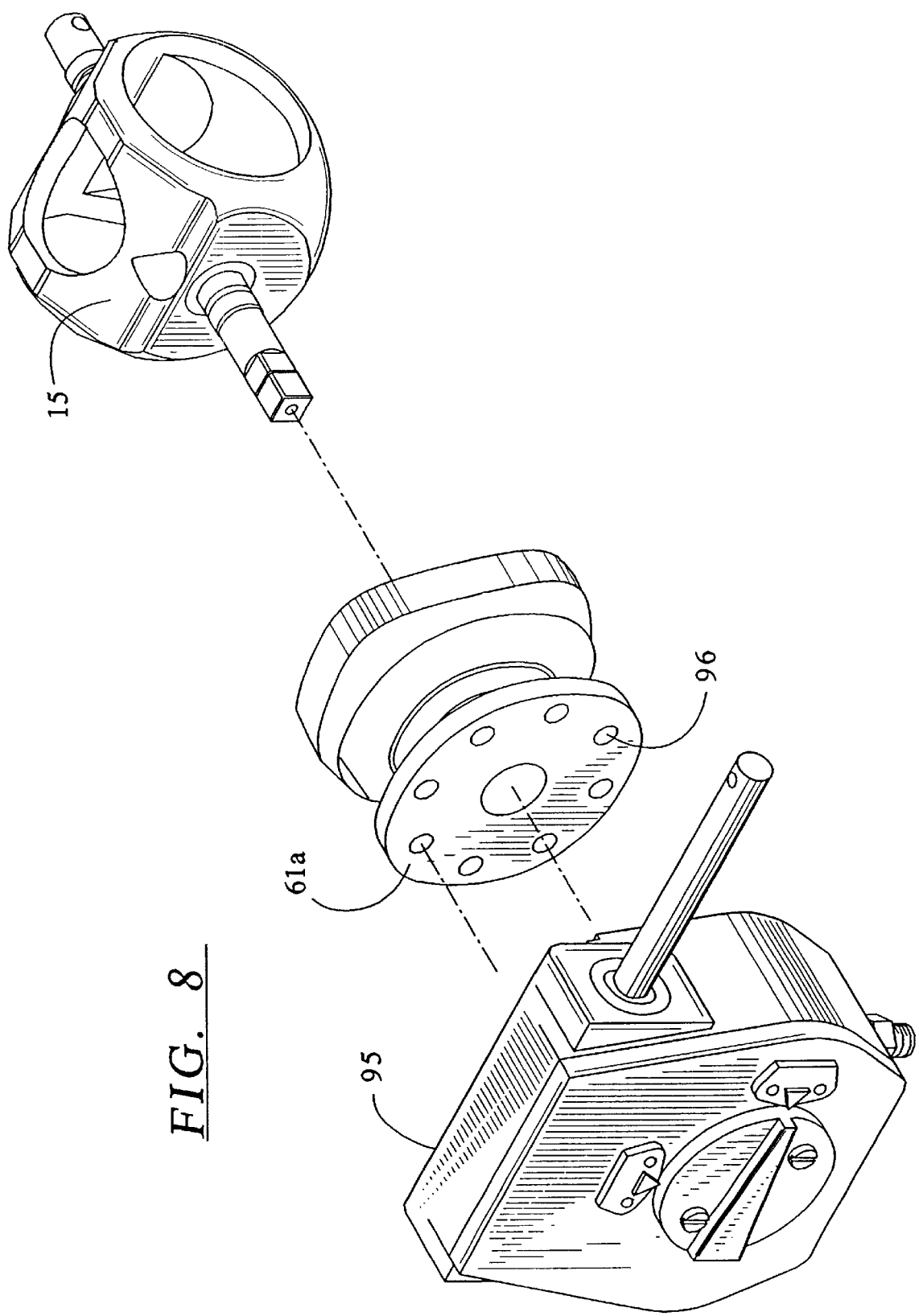
FIG. 8 is a partial exploded view of a ball valve made in accordance with the present invention, particularly illustrating the ball element, top collar and actuator.
Figure 9:
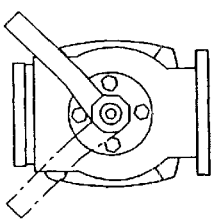
FIGS. 9–16 illustrate the eight different mounting positions of the handle on a ball valve made in accordance with the present invention.
Figure 10:
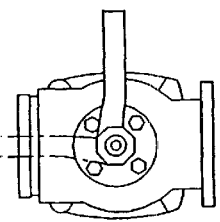
Figure 11:
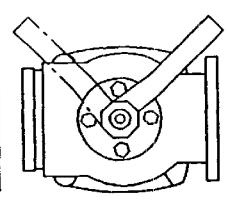
Figure 12:
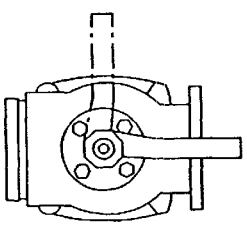
Figure 13:
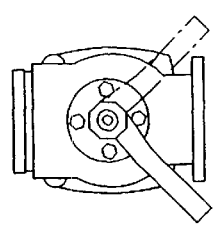
Figure 14:
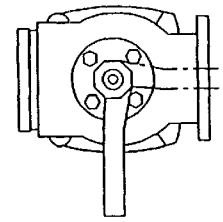
Figure 15:
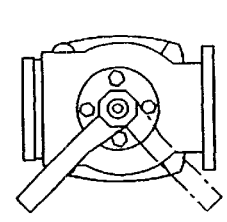
Figure 16:
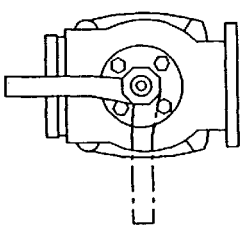
Figure 17:
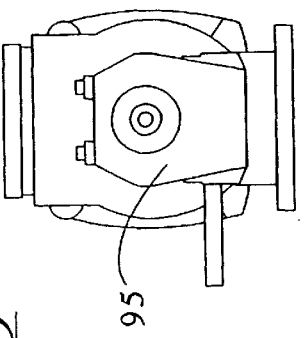
FIGS. 17–20 illustrate the four different mounting positions of an actuator on a ball valve made in accordance with the present invention.
Figure 18:
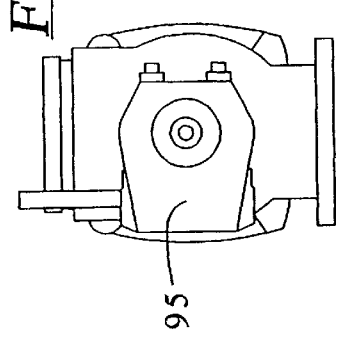
Figure 19:
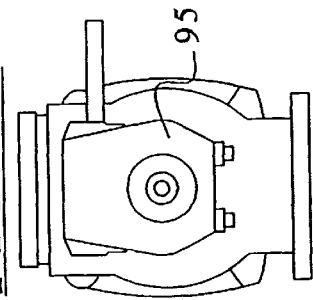
Figure 20:
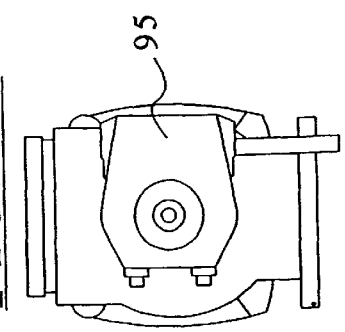

Turning to FIG. 8, the connection of an actuator 95 to the top collar 61a is illustrated. The plurality of holes 96 in the top collar 61a enables the actuator to be mounted in one of four positions as shown in FIGS. 17–20.

Figure 22:
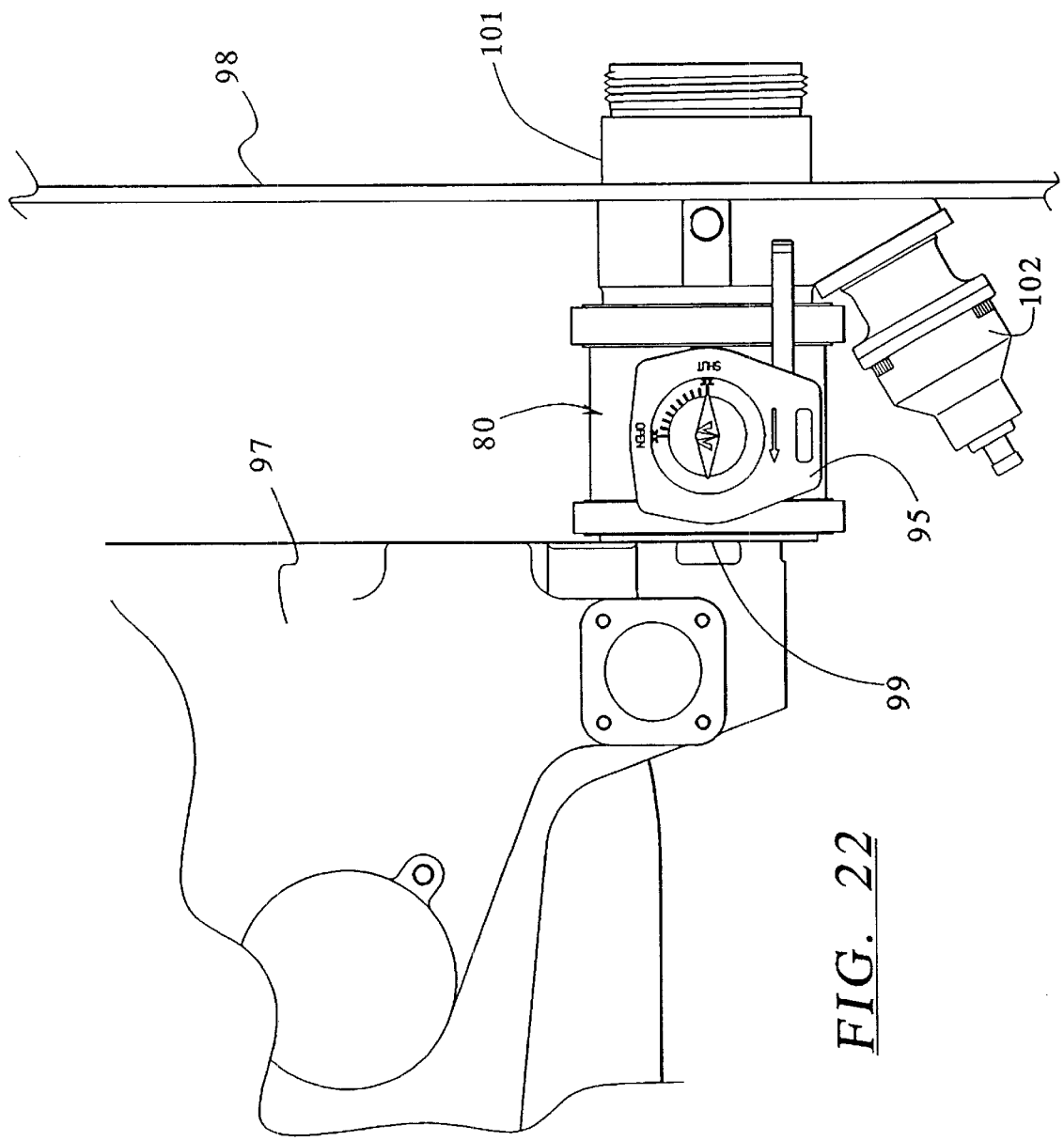
FIG. 22 illustrates a firefighting apparatus made in accordance with the present invention, particularly illustrating the configuration of the pump, ball valve, actuator, relief valve, discharge outlet, discharge conduit and enclosure panel.

Finally, turning to FIG. 22, the position of the valve 80 between a pump 97 and a housing panel 98 is illustrated. In the embodiment shown in FIG. 22, the valve 80 is connected to the discharge outlet 99 of the pump 97 as well as to an outlet conduit 101. The relief valve is shown at 102 and a gear actuator is shown at 95. As discussed above, the placement of the valve 80 between the pump 97 and panel 98 enables the relief valve 102 to be disposed behind the panel 98, which is a significant safety advantage. The relief valve 102 is generally not available to be tampered with and the failure of the relief valve 102 behind a panel 98 is less likely to cause injury to a firefighter than the failure of a relief valve 102 outside of the panel 98. Still further, the placement of the relief valve 102 outside of the panel can cause an additional safety hazard because, depending upon the design of the firetruck, the relief valve 102 can extend outward beyond the outer body of the truck thereby creating a driving hazard.

From the above description, it is apparent that the objects and advantages of the present invention have been achieved. While only certain embodiments have been set forth and described, other alternative embodiments and various modifications will be apparent from the above description to those skilled in the art. These and other alternatives are considered equivalents and within the spirit and scope of the present invention.

What is claimed is:

1. A method of lubricating a ball valve comprising the following steps:

providing a ball valve comprising a valve body comprising two open ends and a ball disposed within the valve body, one end of the body comprising a seat housing, the seat housing comprising an inner surface with a recess for accommodating a seal assembly between the seat housing and the ball, the seal assembly comprising a seat member, a load bearing seal and a soft seal, the seat member comprising a cylindrical body extending along the inner surface of the seat housing, the cylindrical body comprising an inner end directed at the ball and an outer end directed away from the ball, the cylindrical body being connected to a radially outwardly extending flange disposed between the inner and outer ends thereof that extends into the recess of the seat housing, the flange supporting the load bearing seal and the soft seal between the flange and the ball, the seat housing further comprising an outer surface and a passageway that provides communication between the recess and the outer surface, the valve further comprising a lubrication fitting connected to the passageway at the outer surface of the seat housing, the flange of the seat member comprising an aperture extending through the flange of the seat member and between the soft seal and the load bearing seal, the aperture providing communication between the recess and the soft seal, the load bearing seal and the ball; and injecting lubricating fluid into the lubricating fitting and through the passageway and aperture of the flange.

2. A method of lubricating a ball valve comprising the following steps:

providing a ball valve comprising a valve body comprising two open ends and a ball disposed within the valve body, one end of the body comprising a seat housing, the seat housing comprising an inner surface with a recess for accommodating a seal assembly between the seat housing and the ball, the seat housing recess forming an annular ledge that faces the ball, the seal assembly comprising a seat member, a load bearing seal and a soft seal, the seat member comprising a cylindrical body extending along the inner surface of the seat housing, the cylindrical body comprising an inner end directed at the ball and an outer end directed away from the ball, the cylindrical body being connected to a radially outwardly extending flange disposed between the inner and outer ends thereof that extends into the recess of the seat housing, the flange supporting the load bearing seal and the soft seal between the flange and the ball, the seat housing further comprising an outer surface and a passageway that provides communication between the recess and the outer surface, the valve further comprising a lubrication fitting connected to the passageway at the outer surface of the seat housing, the flange of the seat member being spaced from the ledge with a sealing ring disposed there between, the sealing ring being disposed radially inwardly from the inner surface of the seat housing thereby providing an annular space defined by the sealing ring, the inner surface of the seat housing, the ledge and the flange of the seat member, the flange of the seat member comprising an aperture extending through the flange of the seat member and between the soft seal and the load bearing seal, the aperture providing communication between the recess and the soft seal, the load bearing seal and the ball, and the passageway providing communication between the lubrication fitting and the annular space, and;

injecting lubricating fluid into the lubricating fitting and through the passageway and aperture of the flange.

* * * * *